United States Patent
Fazzano

(10) Patent No.: US 6,732,916 B1
(45) Date of Patent: May 11, 2004

(54) AUTOMATED TICKET CANCELLATION DEVICE AND PROCESS FOR CANCELING UNIQUELY NUMBERED TICKETS

(75) Inventor: Nicholas G. Fazzano, Providence, RI (US)

(73) Assignee: GTech Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 09/549,410

(22) Filed: Apr. 14, 2000

(51) Int. Cl.⁷ .............................................. G06F 17/00
(52) U.S. Cl. ...................... 235/375; 235/454; 463/17
(58) Field of Search .................. 358/1.12; 382/187; 235/375, 380, 381, 454, 487, 493; 101/483; 463/16, 17; 273/138.1

(56) References Cited

U.S. PATENT DOCUMENTS

| | | | |
|---|---|---|---|
| 4,095,824 A | | 6/1978 | Bachman |
| 4,103,150 A | * | 7/1978 | von Ballmoos ............. 235/454 |
| 4,374,564 A | * | 2/1983 | Miller et al. ................. 209/583 |
| 4,468,037 A | | 8/1984 | Kuhn |
| 4,494,197 A | | 1/1985 | Troy et al. |
| 4,659,073 A | | 4/1987 | Leonard |
| 4,689,742 A | | 8/1987 | Troy et al. |
| 4,724,307 A | | 2/1988 | Dutton et al. |
| 4,738,441 A | | 4/1988 | Leonard |
| 4,772,025 A | | 9/1988 | James et al. |
| 4,788,419 A | * | 11/1988 | Walters et al. .............. 235/381 |
| 4,880,964 A | | 11/1989 | Donahue |
| 4,892,313 A | | 1/1990 | James et al. |
| 4,897,531 A | | 1/1990 | Someya et al. |
| 5,073,700 A | | 12/1991 | D'Onofrio |
| 5,109,153 A | * | 4/1992 | Johnsen et al. ............. 235/468 |
| 5,120,076 A | | 6/1992 | Luxenberg et al. |
| 5,128,752 A | | 7/1992 | Von Kohorn |
| 5,235,167 A | | 8/1993 | Dvorkis et al. |
| 5,317,135 A | | 5/1994 | Finocchio |
| 5,682,819 A | * | 11/1997 | Beaty .......................... 235/375 |
| 5,772,510 A | | 6/1998 | Roberts |
| 5,927,716 A | | 7/1999 | Goodson et al. |
| 5,930,206 A | * | 7/1999 | Haas et al. .................. 368/327 |
| 5,935,000 A | | 8/1999 | Sanchez, III et al. |
| 5,949,042 A | | 9/1999 | Dietz, II et al. |
| 5,996,997 A | | 12/1999 | Kamille |
| 6,000,725 A | | 12/1999 | Nicolosi et al. |
| 6,024,641 A | | 2/2000 | Sarno |
| 6,047,964 A | * | 4/2000 | Lawandy et al. ......... 273/138.1 |
| 6,086,477 A | * | 7/2000 | Walker et al. ................ 463/17 |
| 6,107,932 A | * | 8/2000 | Walker et al. ............. 340/5.22 |

(List continued on next page.)

FOREIGN PATENT DOCUMENTS

| | | |
|---|---|---|
| CA | 2333576 | 12/1999 |
| CA | 2299074 | 4/2000 |
| DE | 3912907 A1 * | 10/1990 |
| WO | WO 99/62019 | 12/1999 |
| WO | WO 01/78856 | 10/2001 |
| WO | WO 01/80162 | 10/2001 |

OTHER PUBLICATIONS

International Search Report to International Application PCT/US01/12225, Jun. 2001.

*Primary Examiner*—Jared J. Fureman
(74) *Attorney, Agent, or Firm*—Kenyon & Kenyon

(57) ABSTRACT

The present invention is directed to a lottery terminal capable of canceling a uniquely numbered lottery ticket having a control number and an area with thermally reactive coating material disposed thereon. The lottery terminal includes a microprocessor for controlling the operation of the device, an imager for imaging the lottery ticket, memory for storing data pertinent to the lottery ticket, and an automated lottery ticket cancellation device including a receiver for receiving the lottery ticket therein and a thermal head for generating heat. The thermal head of the device permanently marks the lottery ticket at the area when positioned adjacent the thermal head prior to the imaging the lottery ticket. A process for canceling a uniquely numbered ticket is further described.

26 Claims, 2 Drawing Sheets

U.S. PATENT DOCUMENTS

| | | |
|---|---|---|
| 6,155,491 A | 12/2000 | Dueker et al. |
| 6,186,404 B1 * | 2/2001 | Ehrhart et al. ............... 235/493 |
| 6,304,660 B1 | 10/2001 | Ehrhart et al. |
| 6,368,219 B1 | 4/2002 | Szrek et al. |
| 6,405,929 B1 | 6/2002 | Ehrhart et al. |
| 6,419,157 B1 | 7/2002 | Ehrhart et al. |
| 6,618,504 B1 * | 9/2003 | Yoshino ..................... 382/187 |
| 6,650,427 B2 * | 11/2003 | Brooks et al. ............. 358/1.12 |
| 2002/0047259 A1 | 4/2002 | Lambert et al. |
| 2002/0066851 A1 | 6/2002 | Hennick et al. |
| 2002/0113124 A1 * | 8/2002 | Meyerhofer et al. ........ 235/454 |

* cited by examiner

AUTOMATED TICKET CANCELLATION DEVICE AND PROCESS FOR CANCELING UNIQUELY NUMBERED TICKETS

BACKGROUND OF THE INVENTION

This invention relates generally to ticket cancellation devices, and more particularly to an automated ticket cancellation device and process for canceling uniquely numbered tickets.

Many attempts have been made over the last several years to cure the problem of adequately canceling tickets. Tickets, such as lottery tickets, are frequently canceled by either scanning a ticket for a bar code applied thereon with a lottery terminal or by manually entering the serial number of the ticket into the lottery terminal. Currently, in some applications, a retailer desiring to cancel an unused ticket (e.g., a preprinted lottery ticket) must manually record the ticket's unique control number and then mechanically punch a hole in the ticket. If the ticket serial number is manually entered into the lottery terminal, there is a serious risk that an incorrect number inputted into the terminal may result in the potential of canceling an otherwise proper ticket. In addition, a person having possession of such ticket may submit the improperly canceled ticket for payment.

As recognized in U.S. Pat. No. 5,682,819 to Beaty, the chance of fraud is relatively large given the ability of lottery agents to reprint tickets, then cancel the tickets after customers have purchased them. Beaty discloses a method for voiding a valid lottery ticket (e.g., a lotto-type ticket) having a serial control number marked thereon. Beaty's method includes the steps of: 1) altering the ticket to mark it void; 2) reading the voided ticket by a lottery terminal; and 3) canceling the serial control number record of the lottery ticket in response to the terminal reading the void mark. Beaty further discloses two primary ways of marking the ticket. The first is by punching a hole in the ticket by a commercially available hole punch. The second is by submitting the ticket to an auxiliary device, such as a printer, and printing indicia on the ticket (e.g., the letters "VOID"). While suitable for their intended purpose, hole punches and printers greatly add to the cost of the terminal, and thus, increase the overall cost of a system implementing Beaty's method of canceling tickets.

SUMMARY OF THE INVENTION

Among the several objects of the present invention are: the provision of an automated ticket cancellation device and process for canceling uniquely numbered tickets which eliminate errors in recording the unique control numbers; the provision of such a device and process which ensure that all canceled tickets have been marked as such; and the provision of such a device and process which reduce the time required to cancel a ticket.

In general, a lottery terminal capable of canceling a uniquely numbered lottery ticket having a control number and an area with thermally reactive coating material disposed thereon includes a microprocessor for controlling the operation of the device, imaging means for imaging the lottery ticket, memory means for storing data pertinent to the lottery ticket, and an automated lottery ticket cancellation device including means for receiving the lottery ticket therein and a thermal head for generating heat. The thermal head of the device permanently marks the lottery ticket at the area when positioned adjacent the thermal head prior to the imaging the lottery ticket.

A process for canceling a uniquely numbered ticket having a control number and an area with thermally reactive coating material disposed thereon comprises the steps of:
(a) inserting the lottery ticket into a lottery terminal having means for receiving the lottery ticket therein;
(b) activating the thermally reactive coating material of the lottery ticket for permanently marking the lottery ticket;
(c) imaging the lottery ticket for detecting the activated thermally reactive coating material and for reading the control number of the lottery ticket; and
(d) recording the control number.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
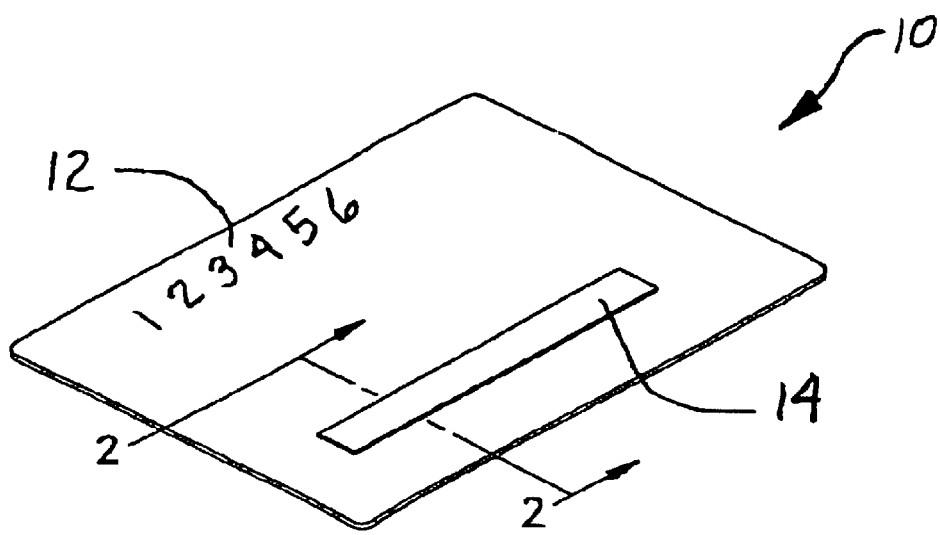
FIG. 1 is a perspective view illustrating a lottery ticket having a strip of thermally reactive material applied thereon.
Figure 2:
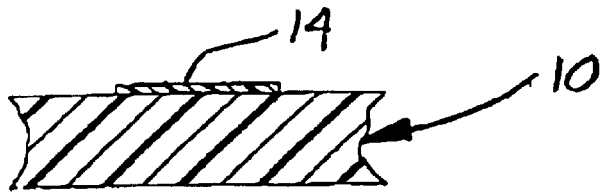
FIG. 2 is a cross-sectional view taken along line 2—2 of FIG. 1.

Referring now to the drawings, and more particularly to FIGS. 1 and 2, there is generally indicated at 10 a lottery ticket having a control number 12 and a strip of reactive coating material 14 which can be manipulated to permanently mark or blemish the lottery ticket 10. The control number 12 can be a unique number particular to the specific lottery ticket 10, or in the form of a bar code, or both. The importance of the control number 12 is that it sets forth the particulars of the ticket 10, including, but not limited to, the numbers (either quick pick or chosen), the drawing, the serial number, etc.

The strip of reactive coating material 14 can be in the form of a thermally reactive coating material or a chemically reactive coating material. Such a thermally reactive coating material is a micro encapsulated black dye. Examples of chemically reactive coating materials are coatings on carbonless paper.

Lottery terminals capable of generating and processing lottery tickets 10 are well known in the art. Examples of such lottery terminals are SPECTRA™ and ISYS™ terminals, which are manufactured by GTECH Corporation of West Greenwich, R.I., U.S.A.

Figure 5:
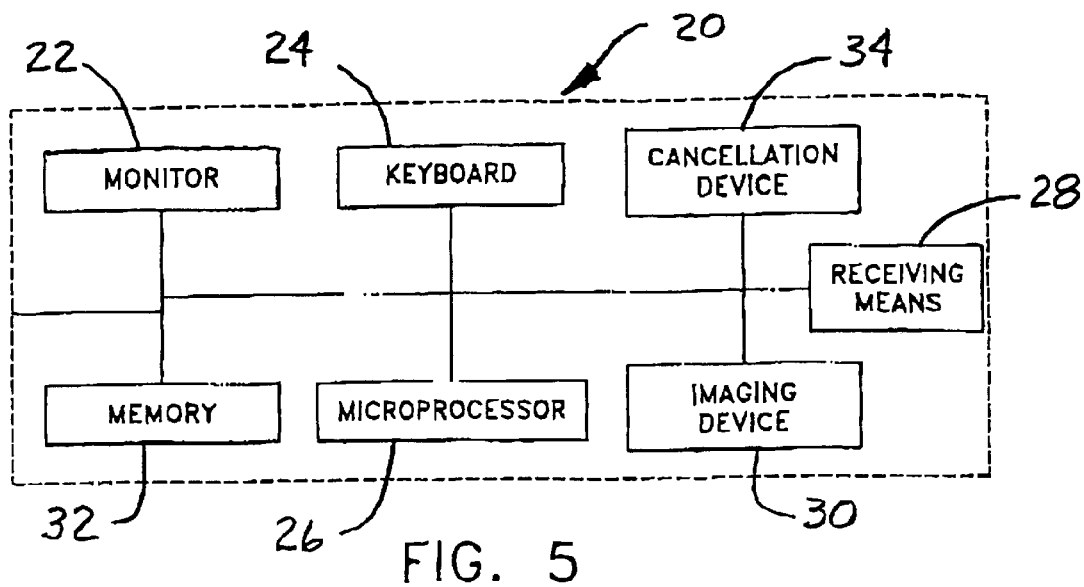
FIG. 5 is a simplified block diagram of a terminal embodying the automated ticket cancellation device.

A schematic of a lottery terminal, generally indicated at 20, is illustrated in FIG. 5. As shown, the lottery terminal 20 includes a monitor 22 for displaying graphical data, a keyboard 24 for inputting data, a microprocessor 26 for controlling the operation of the terminal 20, a receiver 28 for receiving an already issued lottery ticket 10, an imaging device 30 for detecting material and for reading the face or faces of the lottery ticket 10, memory 32 for storing data imaged on lottery tickets, and a cancellation device 34. The lottery terminal 20 can further include other components, such as additional imagers, a printer, bar code readers, etc., all of which are not illustrated in the drawings.

Figure 3:
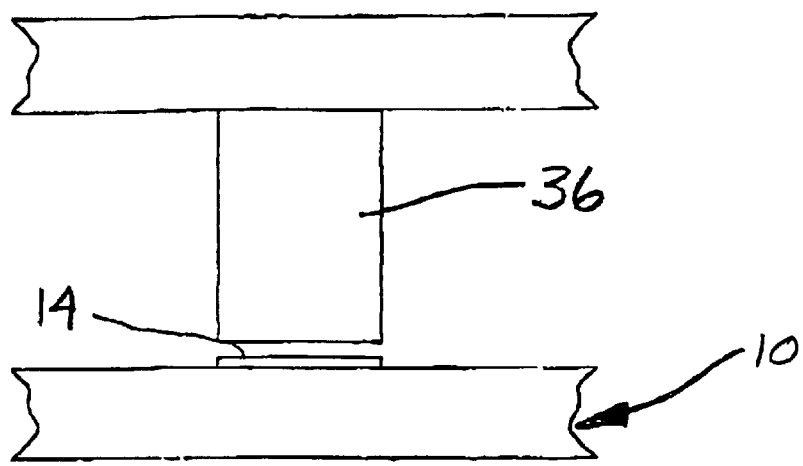
FIG. 3 is a side elevational view illustrating the ticket being read by an automated ticket cancellation device of the present invention.
Figure 4:
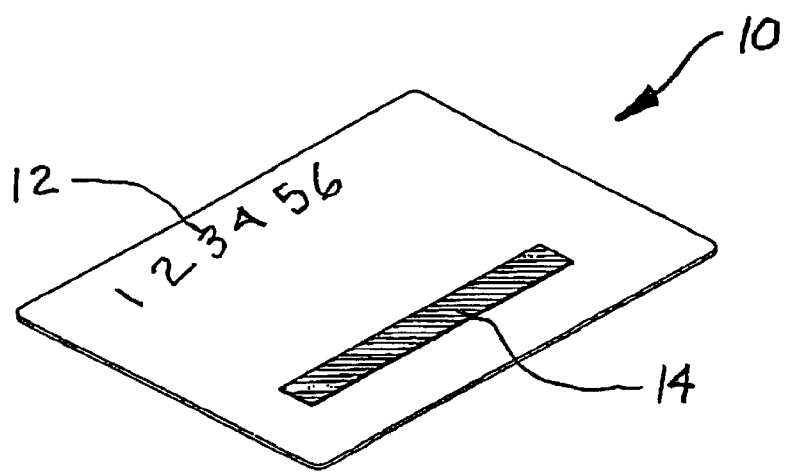
FIG. 4 is a perspective view similar to FIG. 1 after applying the lottery ticket in the device shown in FIG. 3 with the strip thermally activated by the device to have a darkened appearance.

As stated above, the terminal 20 is capable of branding the strip of reactive coating material 14 in the manner illustrated in FIG. 3. Specifically, the cancellation device 34 includes a device 36 which, when processing lottery tickets 10 having a strip of thermally reactive coating material 14, applies heat to the strip 14. In such a case the device 36 can embody a thermal print head, for example. Conversely, when processing lottery tickets 10 having chemically reactive coating material, the device 36 applies a chemical to the strip 14. In a further alternative, when processing lottery tickets 10 having chemically reactive coating material, the device 36 may apply a radiant energy to the chemically reactive coating. It is contemplated that the device 36 of the described lottery terminal 20 is capable of only applying heat, or a chemical, but not both. However certainly such a device 36 is feasible to persons having skill in the art.

The process by which a lottery ticket 10 is cancelled by the lottery terminal 20 is as follows:

(1) inserting the lottery ticket 10 into the receiver 28 of the terminal 20;

(2) activating the device 36 to apply heat or chemical to the strip of reactive coating material 14 on the lottery ticket 10 for permanently marking or branding the ticket 10;

(3) imaging the lottery ticket 10 with the imaging device 30 of the terminal 20 for detecting the activated strip of thermally reactive coating material 14 and for reading the tickets' control number 12; and (4) recording or storing via the memory 32 the information imaged by the imaging device 30.

The process of branding before imaging the ticket can be referred to as "unconditional branding". Branding after imaging the lottery ticket ("conditional branding") is known in the art. Reference can be made to U.S. Pat. No 5,109,153 to Johnsen et al. as an example of a system incorporating conditional branding, i.e., where the lottery terminal brands only if it recognizes the ticket as an "official" lottery ticket. The significance of unconditionally branding the ticket is that unconditional branding shortens the time required to process a transaction since the device does not have to wait to determine if the ticket is an "official" lottery ticket before initiating the branding process.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A lottery terminal capable of canceling an unplayed uniquely numbered lottery ticket having a control number and an area with thermally reactive coating material disposed thereon, the terminal comprising:

a microprocessor for controlling the operation of the terminal;

imaging means for imaging the unplayed lottery ticket;

memory means for storing data pertinent to the unplayed lottery ticket; and an automated lottery ticket cancellation device including means for receiving the unplayed lottery ticket therein and a thermal device for generating heat, the thermal device of the cancellation device automatically permanently marking the unplayed lottery ticket when the unplayed lottery ticket is received by the terminal for cancellation prior to the imaging means imaging the unplayed lottery ticket.

2. A system for canceling an unplayed uniquely numbered lottery ticket comprising:

an unplayed lottery ticket having a control number and an area with thermally reactive coating material disposed thereon; and a terminal having a microprocessor for controlling the operation of the terminal, imaging means for imaging the unplayed lottery ticket, memory means for storing data pertinent to the unplayed lottery ticket, and an automated lottery ticket cancellation device including means for receiving the unplayed lottery ticket therein and a thermal device for generating heat, the thermal device of the cancellation device automatically permanently marking the unplayed lottery ticket when the unplayed lottery ticket is received by the terminal for cancellation prior to the imaging means imaging the unplayed lottery ticket.

3. A process for canceling an unplayed uniquely numbered ticket having a control number and an area with thermally reactive coating material disposed thereon, the process comprising:

inserting the unplayed lottery ticket into a lottery terminal having means for receiving the unplayed lottery ticket therein;

while the unplayed lottery ticket is inserted in the terminal, automatically activating the thermally reactive coating material of the unplayed lottery ticket for permanently marking the unplayed lottery ticket;

while the unplayed lottery ticket is inserted in the terminal, following the activating step, imaging the unplayed lottery ticket for detecting the activated thermally reactive coating material and for reading the control number of the unplayed lottery ticket; and recording the control number.

4. A lottery terminal capable of canceling an unplayed uniquely numbered lottery ticket having a control number and an area with chemically reactive coating material disposed thereon, the terminal comprising:

a microprocessor for controlling the operation of the terminal;

imaging means for imaging the unplayed lottery ticket when the unplayed lottery ticket is received by the terminal for cancellation;

memory means for storing data pertinent to the unplayed lottery ticket; and an automated lottery ticket cancellation device including means for receiving the unplayed lottery ticket therein and a radiant energy source for generating radiant energy, the radiant energy source of the cancellation device automatically permanently marking the unplayed lottery ticket when the unplayed lottery ticket is received by the terminal for cancellation prior to the imaging means imaging.

5. A process for canceling an unplayed uniquely numbered ticket having a control number and an area with chemically reactive coating material disposed thereon, the process comprising:

inserting the unplayed lottery ticket into a lottery terminal having means for receiving the unplayed lottery ticket therein;

while the unplayed lottery ticket is inserted in the terminal, automatically activating the chemically reactive coating material of the lottery ticket for permanently marking the unplayed lottery ticket;

while the unplayed lottery ticket is inserted in the terminal, following the activating step, imaging the unplayed lottery ticket for detecting the activated chemically reactive coating material and for reading the control number of the lottery ticket; and recording the control number.

6. A lottery terminal configured for canceling an unplayed lottery ticket having a reactive area, comprising:

a controller;

an imaging device in communication with the controller, the imaging device configured to image the unplayed lottery ticket;

a memory in communication with the controller and configured to store data pertinent to the unplayed lottery ticket; and an automated lottery ticket cancellation device in communication with the controller and configured to receive the unplayed lottery ticket and automatically permanently mark the area prior to imaging the unplayed lottery ticket when the unplayed lottery ticket is received by the terminal for cancellation.

7. The lottery terminal configured for canceling an unplayed lottery ticket having a reactive area of claim 6, wherein:

the reactive area is a thermally reactive coating material disposed on the lottery ticket and the automated lottery ticket cancellation device includes a thermal device for generating heat and configured to automatically permanently mark the area when the unplayed lottery ticket is positioned adjacent the thermal device.

8. The lottery terminal configured for canceling an unplayed lottery ticket having a reactive area of claim 6, wherein:

the reactive area is a chemically reactive coating material disposed on the lottery ticket and the automated lottery ticket cancellation device includes a radiant energy source configured to generate radiant energy and to automatically permanently mark the area when the unplayed lottery ticket is positioned adjacent the radiant energy device.

9. The lottery terminal configured for canceling an unplayed lottery ticket having a reactive area of claim 6, wherein:

the reactive area is a chemically reactive coating material disposed on the lottery ticket and the automated lottery ticket cancellation device includes a chemical application device configured to apply a chemical to the reactive area and to automatically permanently mark the area when the unplayed lottery ticket is positioned adjacent the radiant energy device.

10. The lottery terminal configured for canceling an unplayed lottery ticket having a reactive area of claim 6, further comprising:

an input device in communication with the controller, the input device configured to receive a request to cancel an unplayed lottery ticket and to communicate the request to the controller.

11. The lottery terminal configured for canceling an unplayed lottery ticket having a reactive area of claim 10, wherein the controller is further configured to activate the cancellation device in response to the request communicated from the input device.

12. The lottery terminal configured for canceling an unplayed lottery ticket having a reactive area of claim 6, further comprising:

an output device in communication with the controller, the output device configured to produce an indication that a refund should be provided for a canceled ticket only after the ticket has been permanently marked.

13. A method for canceling an unplayed lottery ticket having a reactive area, said method comprising:

receiving the unplayed lottery ticket in a lottery terminal;

while the unplayed lottery ticket is received in the lottery terminal, automatically permanently marking the unplayed lottery ticket by activating the reactive area; and while the unplayed lottery ticket is received in the lottery terminal, after the permanent marking, imaging the unplayed lottery ticket.

14. The method for canceling an unplayed lottery ticket having a reactive area of claim 13, wherein the reactive area is a thermally reactive coating material disposed on the unplayed lottery ticket and wherein the permanent marking includes heating the reactive area.

15. The method for canceling an unplayed lottery ticket having a reactive area of claim 13, wherein the reactive area is a chemically reactive coating material disposed on the unplayed lottery ticket and wherein the permanent marking includes applying radiant energy to the reactive area.

16. The method for canceling an unplayed lottery ticket having a reactive area of claim 13, further comprising:

after permanent marking, recording a control number of the unplayed lottery ticket.

17. The method for canceling an unplayed lottery ticket having a reactive area of claim 13, further comprising:

detecting the permanent marking of the reactive area.

18. The method for canceling an unplayed lottery ticket having a reactive area of claim 17, further comprising:

after the permanent marking of the reactive area has been detected, generating a message that a refund should be provided for the canceled lottery ticket.

19. The method for canceling an unplayed lottery ticket having a reactive area of claim 17, further comprising:

after the permanent marking of the reactive area has been detected, generating a replacement lottery ticket.

20. A lottery terminal configured for canceling an unplayed lottery ticket having a reactive area, comprising:

a controller, a ticket receiver in communication with the controller, the ticket receiver configured to receive the unplayed lottery ticket for cancellation; and an unconditional branding device in communication with the controller, the unconditional branding device configured to automatically cancel the unplayed lottery ticket by permanently branding the reactive area when the unplayed lottery ticket is received for cancellation;

an imaging device in communication with the controller, the imaging device configured to image the unplayed lottery ticket while the unplayed lottery ticket is received for cancellation by the terminal, after the reactive area has been permanently branded.

21. The lottery terminal of claim 20, wherein the reactive area is a thermally reactive coating material disposed on the unplayed lottery ticket, and the unconditional branding device includes a thermal device for generating heat and configured to permanently brand the reactive area when the unplayed lottery ticket is positioned adjacent the thermal device.

22. The lottery terminal of claim 20, wherein the reactive area is a chemically reactive coating material disposed on the unplayed lottery ticket, and the unconditional branding device includes a radiant energy source configured to generate radiant energy and to permanently brand the reactive area when the unplayed lottery ticket is positioned adjacent the radiant energy source.

23. The lottery terminal of claim 20, wherein the reactive area is a chemically reactive coating material disposed on the unplayed lottery ticket, and the unconditional branding device includes a chemical application device configured to apply a chemical to the reactive area and to permanently brand the reactive area when the unplayed lottery ticket is positioned adjacent the chemical application device.

24. The lottery terminal of claim 20, further comprising:

an input device in communication with the controller, the input device configured to receive a request to cancel the unplayed lottery ticket and to communicate the request to the controller.

25. The lottery terminal of claim 24, wherein the controller is further configured to activate the cancellation device in response to the request communicated from the input device.

26. The lottery terminal of claim 20, further comprising:

an output device in communication with the controller, the output device configured to produce an indication that a refund should be provided for the unplayed lottery ticket only after the unplayed lottery ticket has been permanently branded.

* * * * *